United States Patent [19]
Kanno et al.

[11] Patent Number: 5,606,952
[45] Date of Patent: Mar. 4, 1997

[54] ENGINE CONTROL SYSTEM

[75] Inventors: Isao Kanno; Masahiko Kato, both of Shizuoka-ken, Japan

[73] Assignee: Yamaha Hatsudoki Kabushiki Kaisha, Iwata, Japan

[21] Appl. No.: 553,891

[22] Filed: Nov. 6, 1995

[30] Foreign Application Priority Data

Nov. 7, 1994 [JP] Japan ................... 6-272127
Nov. 9, 1994 [JP] Japan ................... 6-275122

[51] Int. Cl.⁶ ........................................ F02P 5/00
[52] U.S. Cl. ........................................ 123/413
[58] Field of Search ........................ 123/413, 414, 123/406, 416, 417, 329, 339.1, 339.11, 400

[56] References Cited

U.S. PATENT DOCUMENTS

| | | | |
|---|---|---|---|
| 4,492,198 | 1/1985 | Okumura | 123/413 |
| 5,062,403 | 11/1991 | Breckenfield et al. | 123/413 |
| 5,273,016 | 12/1993 | Gillespie et al. | 123/403 |
| 5,448,974 | 9/1995 | Toda | 123/400 |
| 5,515,825 | 5/1996 | Arai et al. | 123/413 |

*Primary Examiner*—Raymond A. Nelli
*Attorney, Agent, or Firm*—Knobbe, Martens, Olson & Bear, LLP

[57] ABSTRACT

A number of embodiments of engine control systems wherein the engine speed is controlled during a range of movement from idle to a pick-up position by varying primarily the spark timing and thereafter the throttle valve is opened. The throttle valve is maintained in its idle position in a partially open position which will permit greater air flow than required for idle and the speed is controlled by retarding the spark. In addition, further spark retardation is accomplished if the temperature of the engine is below a predetermined minimum desired operating condition for transferring more fuel energy to engine heating than power output for promoting more rapid warmup.

29 Claims, 12 Drawing Sheets

ENGINE CONTROL SYSTEM

BACKGROUND OF THE INVENTION

This invention relates to an internal combustion engine and more particularly to an improved control system and method for such engines.

In order to improve engine transitional performance particularly when going from idle to off idle and mid-range, it has been proposed to provide a system wherein the throttle valve is maintained in a more fully open position than normal when the accelerator pedal or throttle control is in its idle condition. By keeping the throttle valve more fully open, air flow can more easily increase in velocity when engine speed increases are called for.

Since the throttle valve is held more fully open at idle than required to supply the engine's air flow requirements at idle, some other arrangement is provided for controlling the engine speed and/or power output during the time period when the throttle is more open than the throttle control position would dictate. For example and as shown in co-pending application Ser. No. 08/299,517, entitled "Combustion Control System For Internal Combustion Engine", filed Sep. 1, 1994 (SANSH2.671A) and assigned to the assignee hereof, there is disclosed an arrangement wherein the appropriate idle speed is maintained by disabling the firing of one or more cylinders. Hence, in the time interval when the operator throttle control moves from its idle position until the throttle valve is more fully open, engine speed is controlled by a means other than by controlling the throttle valve position.

This system, although highly effective, controls the engine speed and/or power output by selectively disabling a number of cylinders. The cylinders are disabled by either cutting off fuel supply and/or cutting off firing of the spark plugs although effective this is cumbersome and can present other problems.

It is, therefore, a principal object of this invention to provide an improved control system and method for an internal combustion engine.

It is yet further an object of this invention to provide an arrangement where the throttle valve may be left in a substantial partially open position at idle and off idle and the speed and/or power may be controlled in another manner.

Another running condition of the engine which is quite critical is initial warm up. When a cold engine is first started, it is generally necessary to provide a richer than normal fuel air ratio. This is done so as to compensate for the condensation or lack of total vaporization of the fuel supplied to the engine. Obviously this is an undesirable running condition and various arrangements have been proposed for assisting in more rapid warm up of the engine.

For example, it is the common practice to operate the engine at a faster than normal speed or racing of the engine during initial warm up. By running the engine faster than normal then the engine will reach an operating temperature sooner. However, this has a disadvantage in that excess fuel consumption results.

In addition, when the engine speed is increased, the spark advance is increased and the fuel supply amount is even further increased. Hence, the engine operates in such a way as to consume more fuel but also do it in a generally more efficient manner that reduces the likelihood of rapid warm up or alternatively does not warm the engine up as fast as possible considering the amount of fuel consumed.

It is well known to vary the spark timing of an engine in response to running characteristics. Generally the firing of the spark plug should be at such a time that the peak pressure in the combustion chamber occurs at some time shortly after top dead center position of the piston. In this way, the maximum amount of energy expanded by the combustion products can be converted into the rotational power of the out engine output shaft.

However and in accordance with an embodiment of this invention the combustion is operated in the combustion chamber in such a way so as to rather than increase the output or rotational speed of the engine, the actual energy created by the burning of the fuel is employed to heat the engine. That is, instead of moving the spark timing to the optimum for the running condition, the spark timing is adjusted so that the maximum pressure in the combustion chamber will occur well after the time that the piston has passed top dead center position. By doing this the heat of the expansion of the gases will not necessarily be transferred into increased power of the engine but rather the heat generated will be transferred to the combustion chamber walls and absorbed as heat energy therein. As a result, the engine will be heated more rapidly and the increased fuel consumption is more directly transferred into a rise in the engine operating temperature rather than increased engine output.

SUMMARY OF THE INVENTION

A first feature of this invention is adapted to be embodied in an internal combustion engine control system and method. The engine is comprised of elements which define a combustion chamber the volume of which vary cyclically during engine operation. An induction and charge forming system delivers a fuel air charge to the combustion chamber for combustion therein. The induction and charge forming system includes a throttle valve for controlling the air flow to the engine. A speed control element which is movable between an idle position, to a pick up position and then to a full throttle position is provided for operator control of the speed of the engine. A throttle control is provided for operative connection between the speed control element and the throttle valve for operative control of the throttle valve. A stop arrangement retains the throttle valve in a partially opened idle position wherein the effective flow area past the throttle valve is substantially greater than that required for idle operation. The throttle control permits movement of the operator speed control element from its idle position to its pick up position before the throttle valve begins to be open from its partially opened idle position. Thereafter, continued movement of the speed control element from its pick up position to its full throttle position results in like movement of the throttle valve. An ignition system is provided for firing the fuel air charge in the combustion chamber and an exhaust system discharges the exhaust gases from the combustion chamber to the atmosphere.

In accordance with a control system embodying the invention means are provided for controlling the engine output primarily by controlling the timing of firing of the ignition system.

In accordance with a method for practicing the invention, the engine speed control during the range of movement of the speed control element from its idle position to its pick up position is controlled by varying the ignition timing.

Another feature of the invention is adapted to be embodied in an internal combustion engine and control system method for improving warm up of the engine. The engine is comprised of elements that define at least one combustion chamber the volume of which varies cyclically during the engine operation. An induction and charge forming system is provided for delivering a fuel air charge to the combustion chamber for combustion therein. An ignition system is provided for firing a spark plug to initiate combustion in the combustion chamber and an exhaust system is provided for discharging exhaust gases from the combustion chamber to the atmosphere. The timing of firing of the spark plug is varied in response to at least one engine running condition.

In accordance with an apparatus for practicing the invention, the temperature of the engine is sensed and the timing of the firing of the spark plug is retarded if the temperature of the engine falls below a predetermined temperature so that the timing of maximum pressure in the combustion chamber will be such to generate heat to the engine rather than increasing the power output of the engine.

In accordance with a method for practicing the invention, the timing of the firing of the spark plug is retarded when the temperature is below a predetermined value so as to generate more heat input to the engine body than power output.

DETAILED DESCRIPTION OF THE PREFERRED EMBODIMENTS OF THE INVENTION

Figure 1:
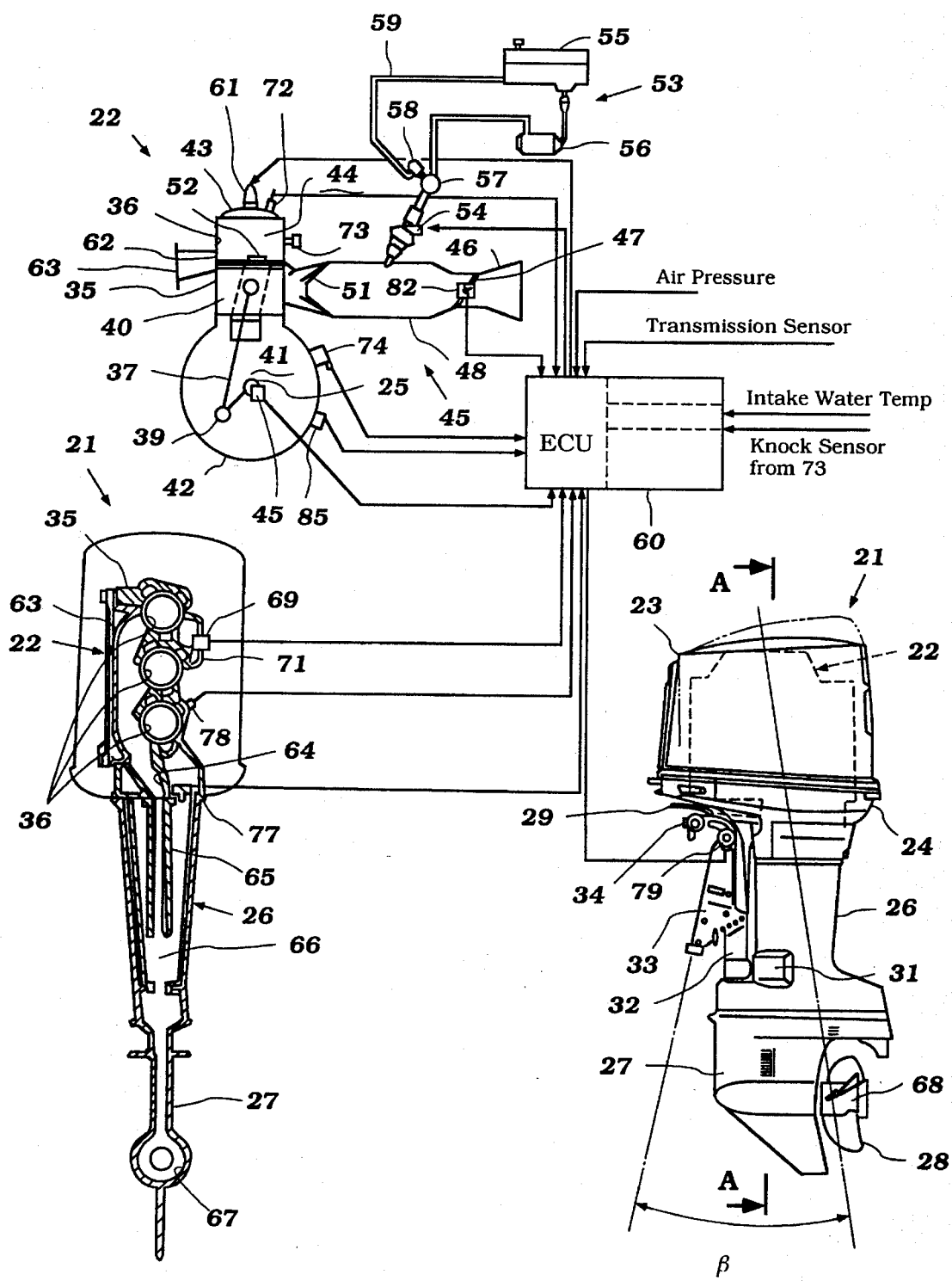
FIG. 1 is a composite view showing, in counter clockwise direction beginning at the lower right hand portion thereof, a side elevational view of an outboard motor constructed and operated in accordance with an embodiment of the invention, a rear elevational view thereof with a portion broken away along the line A—A and shown in section, and a partially schematic cross-sectional view taken along a horizontal plane through one cylinder of the engine.

Referring now in detail to the drawings and initially to FIG. 1, an outboard motor constructed in accordance with an embodiment of the invention is identified generally by the reference numeral 21. The invention is described in conjunction with an outboard motor because the invention deals with an internal combustion engine and control system therefor. Therefore, an outboard motor is a typical application in which an engine constructed in accordance with the invention may be utilized.

In addition, certain features of the invention deal particularly with two-cycle crankcase compression engines. That type of engine frequently is employed in conjunction with outboard motors because of its compact nature and relative simplicity. This is another reason why the outboard motor application is one in which the invention may find utility.

The outboard motor 11 is comprised of a power head that consists of a powering internal combustion engine, indicated generally by the reference numeral 22 and a surrounding protective cowling comprised of a main cowling portion 23 that is detachably connected to a tray portion 24.

As is typical with outboard motor practice, the engine 22 is supported within the power head so that its output shaft, a crankshaft indicated by the reference numeral 25 in the upper view of this figure, rotates about a vertically-extending axis. This crankshaft 25 is rotatably coupled to a drive shaft (not shown) that depends into and is journalled within a drive shaft housing 26. The tray 24 encircles the upper portion of the drive shaft housing 26.

The drive shaft continues on into a lower unit 27 where it can selectively be coupled to a propeller 28 for driving the propeller in selected forward or reverse direction so as to so propel an associated watercraft. A conventional forward reverse bevel gear transmission is provided for this purpose.

A steering shaft (not shown) having a tiller 29 affixed to its upper end is affixed in a suitable manner, by means which include a lower bracket assembly 31, to the drive shaft housing 26. This steering shaft is journalled within a swivel bracket 32 for steering of the outboard motor 21 about a vertically-extending axis defined by the steering shaft.

The swivel bracket 32 is, in turn, connected to a clamping bracket 33 by means of a trim pin 34. This pivotal connection permits tilt and trim motion of the outboard motor 21 relative to the associated transom of the powered water craft. The trim adjustment through the angle β permits adjustment of the angle of the attack of the propeller 28 to obtain optimum propulsion efficiency. In addition, beyond the range defined by the angle β, the outboard motor 21 may be tilted up to and out of the water position for trailering and other purposes, as is well known in this art.

The construction of the outboard motor 21 as thus far described may be considered to be conventional and for that reason, further details of this construction are not illustrated nor are they believed necessary to permit those skilled in the art to practice the invention.

Continuing to refer to FIG. 1 but now referring primarily the lower left hand portion of this Figure and the upper portion, the engine 22 is, in the illustrated embodiment, of the three-cylinder in-line type. To this end, the engine 22 is provided with a cylinder block 35 in which three horizontally extending parallel cylinder bores 36 are formed. Although the invention is described in conjunction with a three-cylinder in-line engine, it will be readily apparent to those skilled in the art how the invention may be utilized with engines having various cylinder numbers and cylinder configurations. In addition, certain facets of the invention may also be employed with non-reciprocating engines.

Pistons shown schematically at 40 in FIG. 1 are connected to connecting rods 37 by means of piston pins 38. The lower or big ends of the connecting rods 37 are journalled on respective throws 39 of the crankshaft 25, as is well known in this art.

The crankshaft 25 is rotatably journalled within a crankcase chamber 41 formed at the lower ends of the cylinder bores 36. The crankcase chambers 41 are formed by the skirt of the cylinder block 35 and a crankcase member 42 that is affixed to the cylinder block 35 in any well known-manner. As has been noted, the engine 22 operates on a two-cycle crankcase compression principal. As is typical with such engines, the crankcase chambers 41 associated with each of the cylinder bores 36 are sealed relative to each other in any suitable manner.

The ends of the cylinder bores 36 opposite the crankcase chambers 41 are closed by means of a cylinder head assembly 43 that is affixed to the cylinder block 35 in any known manner. The cylinder head 43 has recesses which cooperate with the cylinder bores 36 and the heads of the pistons 40 to form combustion chambers, indicated generally by the reference numeral 44. These combustion chambers 44 have a volume which varies cyclically during the reciprocation of the pistons 40 as is well known in this art.

An intake charge is delivered to the crank case chambers 41 for compression therein by means of a charge forming and induction system, indicated generally by the reference numeral 45. The charge forming and induction system 45 includes an air inlet device 46 that is disposed within the protective cowling of the power head and which draws air therefrom. This air is admitted to the interior of the protective cowling by one or more air inlets formed primarily in the main cowling member 25. A throttle valve 47 is positioned in the induction passage or intake manifold 48 that connects the air inlet device 46 to respective intake ports 49 formed in the cylinder block 35 and which communicate with the crankcase chambers 41 in a well known manner.

Read type check valves 51 are provided in each of the intake ports 49 so as to permit a charge to flow into the crank case chambers 41 when the pistons 40 are moving upwardly in the cylinder bores 36. On the other hand, when the pistons 40 move downwardly this charge is compressed in the crankcase chambers 41 and is transferred to the combustion chambers 44 through one or more scavenge passages 52.

Fuel is supplied to the air charge admitted as thus far described by a charge forming system, indicated generally by the reference numeral 53. This charge forming system 53 includes one or more fuel injectors 54 that spray into each of the intake passages 48. Preferably, the fuel injectors 54 are of the electrically operated type having electrically actuated solenoid valve that controls the admission or spraying of fuel into the intake passages 48 upstream of the check valves 51.

Fuel is supplied to the fuel injectors from a remotely positioned fuel tank 55. The fuel tank 55 is, most normally, positioned within the hull of the associated watercraft as is well known in this art. The fuel is drawn through a supply conduit by a pumping system including a high pressure pump 56 which discharges into a main fuel rail 57. The fuel rail 57 supplies fuel to each of the fuel injectors 54 in a known manner.

A pressure control valve 58 is provided in or adjacent the fuel rail 57 and controls the maximum pressure in the fuel rail 57 by dumping excess fuel back to the fuel tank 55 or some other place in the system upstream of the fuel rail 57 through a return conduit 59. The fuel that is mixed with the air in the induction and charge forming system 45 as thus far described will be mixed and delivered to the combustion chambers 44 through the same path already described.

Spark plugs 61 are mounted in the cylinder head 43 and have their gaps extending into the respective combustion chambers 44. These sparks plug 61 are fired by a suitable ignition circuit (not shown) which is triggered by an ECU 60 in a manner which will be described.

When the spark plugs 61 fire, the charge in the combustion chambers 44 will ignite, burn and expand. This expanding charge drives the pistons 40 downwardly to drive the crankshaft 25 in a well known manner. The exhaust gases are then discharged through one or exhaust ports 62 which open through the sides of the cylinder block bores 36 and communicate with an exhaust manifold 63 as shown schematically in the upper view of FIG. 1 and in more detail in the lower left side view of this figure.

The construction of the engine 22 as thus far described may be considered to be conventional and, for that reason, the engine 22 has been shown for the most part schematically. The invention deals with the manner for controlling the engine speed, spark timing and control of the throttle valve 47.

Continuing to describe the discharge of the exhaust gases from the engine and referring now primarily to the lower left hand side view of FIG. 1, the exhaust manifold 63 terminates in a downwardly facing exhaust discharge passage 64 that is formed in an exhaust guide plate upon which the engine 22 is mounted. This exhaust guide plate delivers gases to an exhaust pipe 65 that depends into the drive shaft housing 26.

The drive shaft housing 26 defines an expansion chamber 66 in which the exhaust pipe 65 terminates. From the expansion chamber 66, the exhaust gases are discharged to the atmosphere in any suitable manner such as by means of a underwater exhaust gas discharge 67 which discharges through the hub 68 of the propeller 28 in a manner well known in this art. At lower speeds when the propeller 28 is more deeply submerged, the exhaust gases may exit through and above the water atmospheric exhaust gas discharge (not shown) as also is well known in this art.

In addition to controlling the timing of the firing of the spark plugs 61, the ECU controls the timing and duration of fuel injection of the fuel injector 54 and may control other engine functions. For this purpose, there are provided a number of engine and ambient condition sensors. In addition, there is provided a feedback control system for controlling the fuel air ratio in response to the measurement of the actual fuel air ratio by a combustion condition sensor such as an oxygen ($O_2$) sensor 69 which is positioned in a passageway 71 that interconnects two of the cylinder bores 36 at a point adjacent the point where the exhaust passages 62 are located. This type of feedback control system and placement for the sensor 69 may be of the type described in the co-pending application entitled "Sensor Arrangement For Engine Control System", Ser. No. 08/435,715, filed May 5, 1995, in the name of Masahiko Katoh and assigned to the assignee hereof. That disclosure is incorporated herein by reference.

In addition to the $O_2$ sensor, other sensors of engine and ambient conditions are provided. These include an in-cylinder pressure sensor 72 and knock sensor 73 that are mounted in the cylinder head 43 and cylinder block 35, respectively. The outputs from these sensors are transmitted to the ECU 60.

Air flow to the engine may be measured in any of a variety of fashions and this may be done by sensing the pressure in the crankcase chamber 41 by means of a pressure sensor 74. As is known, actual intake air flow can be accurately measured by the measuring the pressure in the crankcase chamber 41 at a specific crank angle. A crank angle position sensor 75 is, therefore, associated with the crankshaft 25 so as to output a signal to the ECU 60 that can be utilized to calculate intake air flow and, accordingly, the necessary fuel amount so as to maintain the desired fuel air ratio. The crank angle sensor 75 may be also used as a means for measuring engine speed, as is well known in this art.

Intake air temperature is measured by a crankcase temperature sensor 76 which is also positioned in the crankcase 42 and senses the temperature in the crankcase chambers 41.

Exhaust gas back pressure is measured by a back pressure sensor 77 that is mounted in a position to sense the pressure in the expansion chamber 66 within the drive shaft housing 46.

Engine temperature is sensed by an engine temperature sensor 78 that is mounted in the cylinder block 35 and which extends into its cooling jacket. In this regard, it should be noted that the engine 22 is, as is typical with outboard motor practice, cooled by drawing water from the body of the water in which the outboard motor 21 operates. This water is circulated through the engine 22 and specifically its cooling jackets and then is returned to the body of water in any suitable return fashion.

The temperature of the intake water drawn into the engine cooling jacket is also sensed by a temperature sensor which is not illustrated but which is indicated by the arrow in FIG. 1. In addition other ambient conditions such as atmospheric air pressure are transmitted to the ECU 60 by appropriate sensors and as indicated by the arrows in FIG. 1.

Furthermore, the condition of the transmission which, as has been noted, couples the drive shaft to the propeller 28 is determined by a transmission sensor also indicated by the arrow in this figure. This sensor basically indicates the condition of the transmission as to whether it is in a neutral or in a driving condition.

In addition, a trim angle sensor 79 is provided adjacent the trim pin 34 so as to provide a signal indicative of the angle β.

Figure 2:
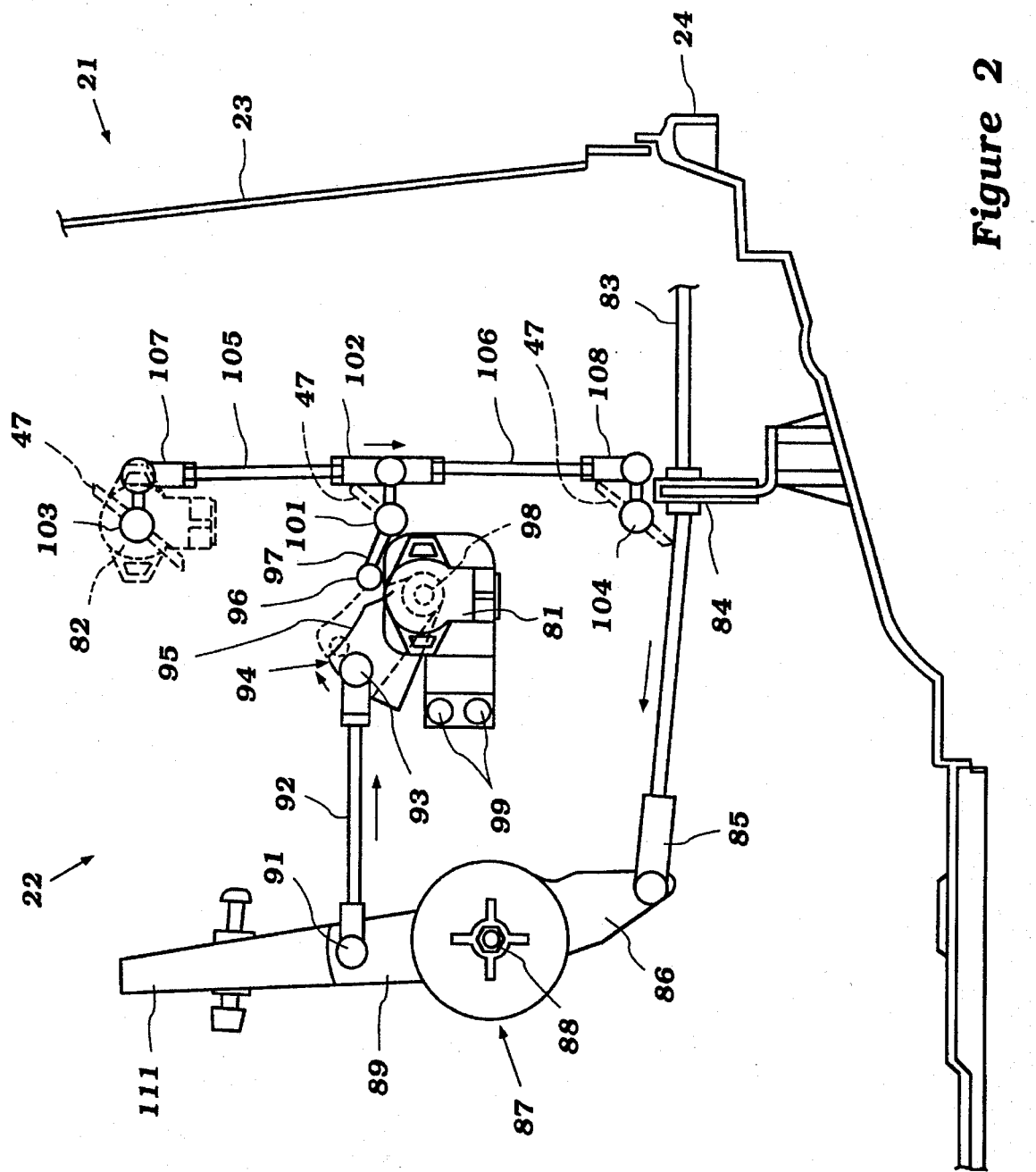
FIG. 2 is an enlarged side elevational view of the power head with the protective cowling broken away and showing the spark advance and throttle control mechanism in accordance with a first embodiment of the invention.

In addition to those sensors which appear in FIG. 1, as will become apparent by reference to FIG. 2, there is also provided a sensor, indicated in FIG. 2 by the reference numeral 81 which senses the position of the operator demand or the speed control element that is operated by the operator. This indicates the operator demand for engine power output.

Again referring to FIG. 1, there is provided a throttle angle position sensor 82 that outputs a signal indicative of the position of the throttle valve 47. As will now be described by reference to FIG. 2, the condition of the operator controlled element may be different from that of the throttle valve 47 and hence the outputs of the sensors 81 and 82 are not directly related under some running conditions, as will become apparent.

Turning now specifically to this situation, the mechanism by which the throttle valve 47 and the timing of the spark plug 61 is controlled will be described by particular reference to FIGS. 2 through 5 with the initial discussion centering on FIG. 2. FIG. 2 is an enlarged view showing the forward portion of the cowling and specifically the area where the mechanism for controlling the position of the throttle valves 47 and the position of a pulser coil associated with the ignition system is located.

A bowden wire actuator 83 extends through the tray 24 and specifically an opening formed therein. The trailing end of the protective sheath of the bowden wire actuator 83 is supported in a supporting bracket 84 via an elastic grommet. The wire actuator 83 has a ferule 85 at its end which is connected to the control lever 86 of a throttle and spark timing control mechanism, indicated generally by the reference numeral 87. The lever 86 is rotatably journalled on a pivot pin 88 that is affixed to the side of the cylinder block 35 of the engine 22 in any appropriate manner.

The control lever has an upper portion 89 that is pivotally connected by a connector 91 to one end of an actuating link 92. The other end of the actuating link 92 is connected by a connector 93 to a throttle actuating cam 94. The throttle actuating cam 94 has an arcuate cam surface 95 which is adapted to engage a follower portion 96 of a throttle control lever 97. The actuating cam 94 is journalled upon a pivot pin 98 which forms a part of the speed control element position sensor 81, the actual speed control element comprising the cam 94. The sensor 81 is mounted to the side of the engine by a pair of fasteners 99.

The throttle control lever 97 is affixed to a throttle valve shaft 101 of the throttle valve 47 of the center-most intake manifold 48 of the engine. A linkage assembly comprised of a T shaped member 102 interconnects the throttle valve shaft 101 with throttle valve shafts 103 and 104 of the upper and lower throttle valves 47 associated with the upper-most and lower-most cylinders of the engine. This linkage assembly includes a pair of links 105 and 106 which are connected to the T-shaped member 102 at one end and by couplings 107 and 108 to the throttle valve shafts 103 and 104, respectively. As a result, the throttle valves 47 will all be operated in unison.

As also seen in this figure, the throttle valve position sensor 82 is associated with the upper-most throttle valve 47. However, since all of the throttle valves 47 operate in unison, this mechanism may be associated with any one of the throttle valve shafts 101, 103 or 104.

The strategy by which the throttle valves 47 are opened will now be described by particular reference to FIG. 3. It is to be understood, however, that this strategy is generally the same as that described in the aforenoted copending application Ser. No. 08/299,517, the disclosure of which has been incorporated herein by reference. Therefore, if any details are omitted reference may be had to that application for them.

Basically, as stop mechanism (not shown) is associated with the throttle valves 47 or the actuating linkage mechanism so that at the idle position the throttle valves are opened at an angle α to a plane 109 which would represent the position if the throttle valve 47 was in its fully closed position. This angle α is approximately 10°–15° and thus is in a position which is wider open than necessary to supply the idle air requirements for the engine 22.

Therefore, the engine 22 could be maintained at the desired idle speed by disabling one or more cylinders in the manner described in that copending application. This method may have some disadvantages as has been noted. In this position and when the throttle control cam 94 or as it is sometimes referred to the speed controlling element is in its idle position as shown in the solid line view of FIG. 3, there will be a substantial gap between the cam surface 95 and the follower 96 associated with the throttle valve 47.

Hence, the cam 94 can and will rotate through an angle which is approximately 10°–15° before its cam surface 95 contacts the follower 96, this point being defined as the pick up point. As the throttle cam 94 moves through this angle the speed or output of the engine is increased primarily by controlling the spark timing. That is the speed at idle is reduced by retarding the spark more than normal to reduce engine speed. As the control element 94 is moved in the speed increasing direction, the spark is advanced, in a manner which will be described, to obtain the desired engine speed.

Figure 3:
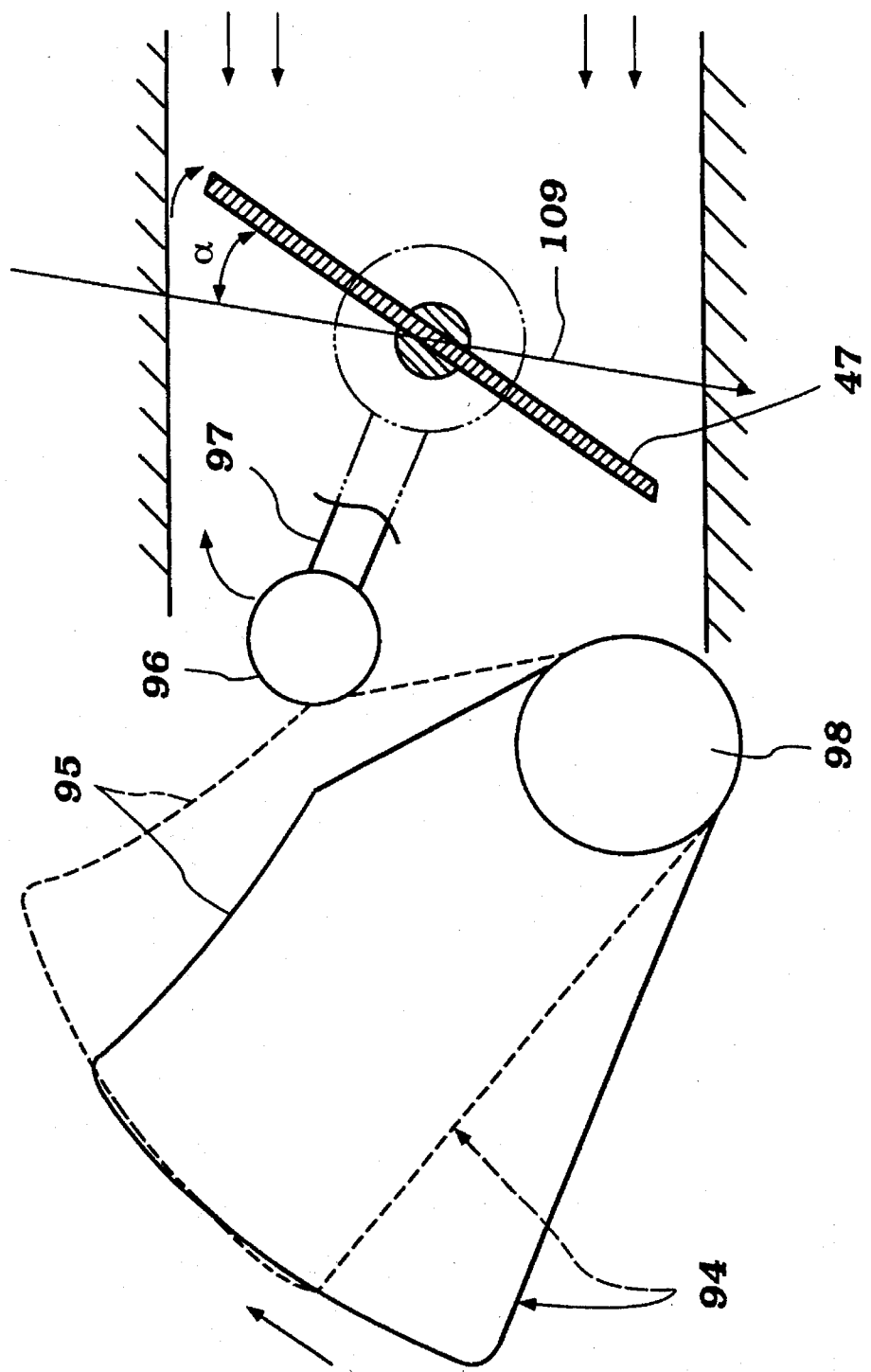
FIG. 3 is an enlarged cross-sectional view showing a portion of the throttle control mechanism so as to explain the operation with the throttle control mechanism with the throttle control element being shown in its idle position in solid lines and in the pick up position in phantom lines.

Thereafter, rotation of the throttle cam 94 causes movement of the throttle valve 47 from its normal idle position as shown in FIG. 3 to its fully opened position. The cam surface 95 is shaped so as to provide the desired degree of relative movement between the throttle cam 94 and the throttle valve 47 under this opening condition.

Referring again to FIG. 2, it will be seen that the engine is also provided with a spark control lever, indicated by the reference numeral 111 which spark control lever is operatively connected to a timing plate (not shown) which is associated with the crank shaft 25 of the engine 22. Normally this timing plate will be positioned at the upper end of the engine and is associated with the flywheel mag needle of the engine. This timing plate carries a pulser coil and when the flywheel magneto is at a specific angular position, an output pulse will be generated by this pulser coil which is utilized as a signal by the ECU 60 so as to determine the spark timing.

Figure 4:
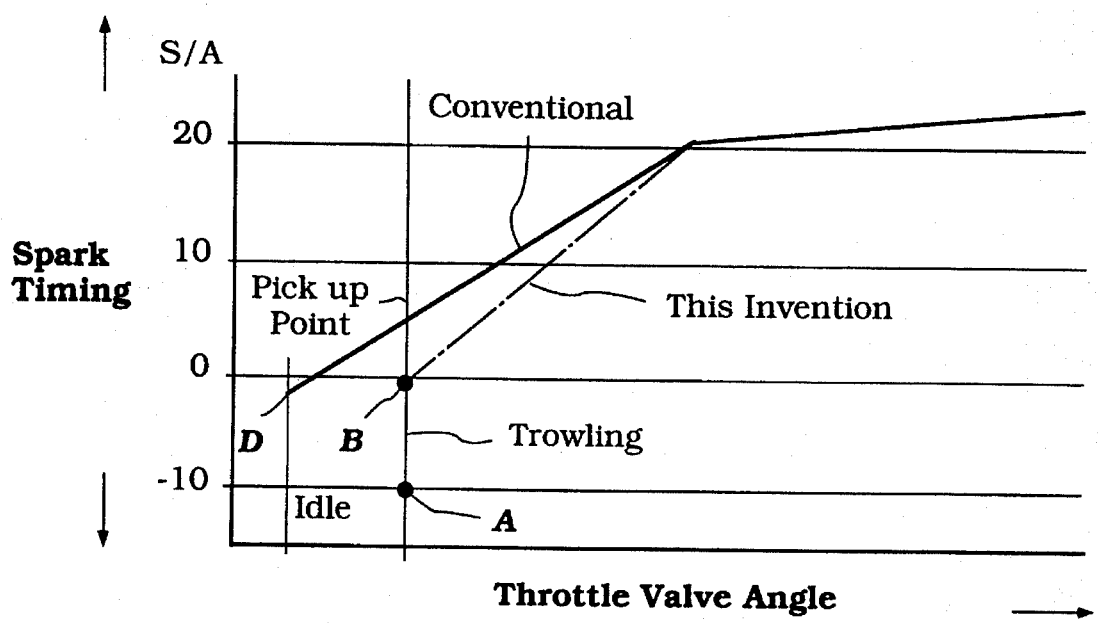
FIG. 4 is a graphical view showing the spark advance timing in relation to throttle valve position in accordance with a prior art type of construction in solid lines and according to the present invention in the phantom lines.
Figure 5:
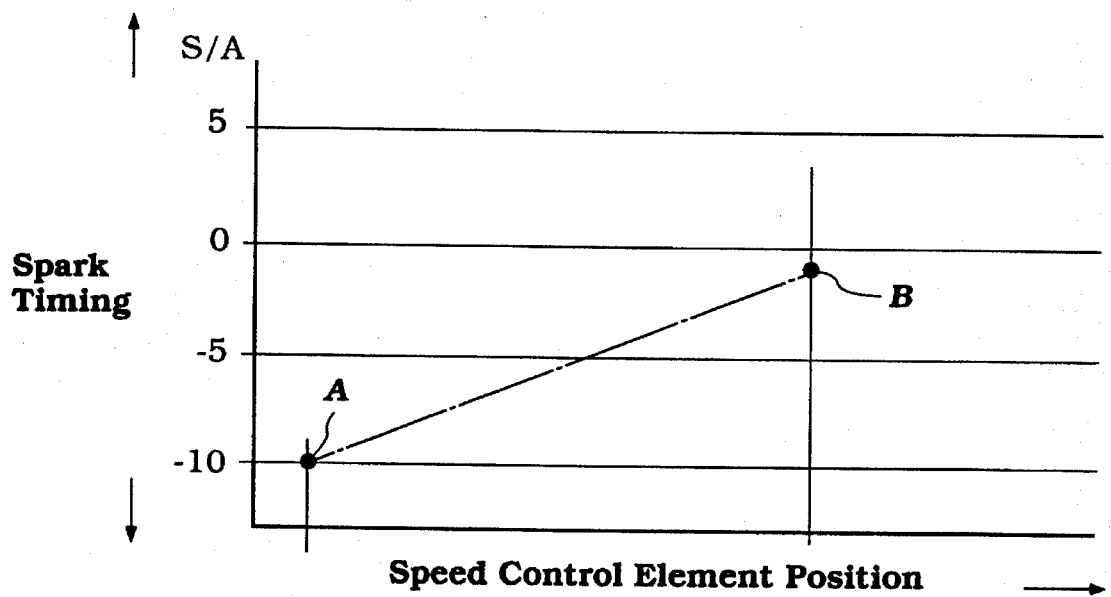
FIG. 5 is an enlarged graphical view of a portion of the spark advance curve showing the operation in accordance with an embodiment of the invention.

The strategy by which the invention controls the spark advance and accordingly the speed will now be described by reference to FIGS. 4 and 5. In FIG. 4, a conventional spark advance curve is shown in solid line. As may be seen, the initial spark timing is set when the operator control is in its idle condition at the point D at approximately 2°–3° before top dead center. This spark advance continues to increase along an inclined ramp in a generally linear fashion so that at the pick up point when the cam surface 95 engages the follower 96 the actual spark timing will be at approximately 5° after top dead center. With conventional spark advance curves, the timing continues to increase in a linear fashion until some point where either the timing is held fixed at approximately 20° before top dead center or it may continue to increase but at a much slower rate as shown in this figure.

In this invention, the spark timing is set much later than conventional such as 10° after top dead center at the idle position A of the speed controlling element or throttle cam 94 to effect a reduction in speed and compensate for the more opened than normal throttle position. From the idle position to the pick up point B the spark is gradually advanced from 10° after top dead center to approximately 2° before top dead center, the conventional idle position. Hence, the spark timing is retarded from that of conventional and thus the engine speed control may be maintained in this fashion rather than by discontinuing the number of cylinders that are fired as with the prior art type of construction described in the aforenoted copending application.

Once the pick up point B is reached, then the spark is continued to advance but at a more rapid rate but beginning at a lower value than with a conventional engine. Thus, engine speed control is obtained better than with the prior art type of construction and without the necessity of discontinuing the firing of certain cylinders. However, if desired, these features may be utilized in conjunction with each other.

Figure 6:
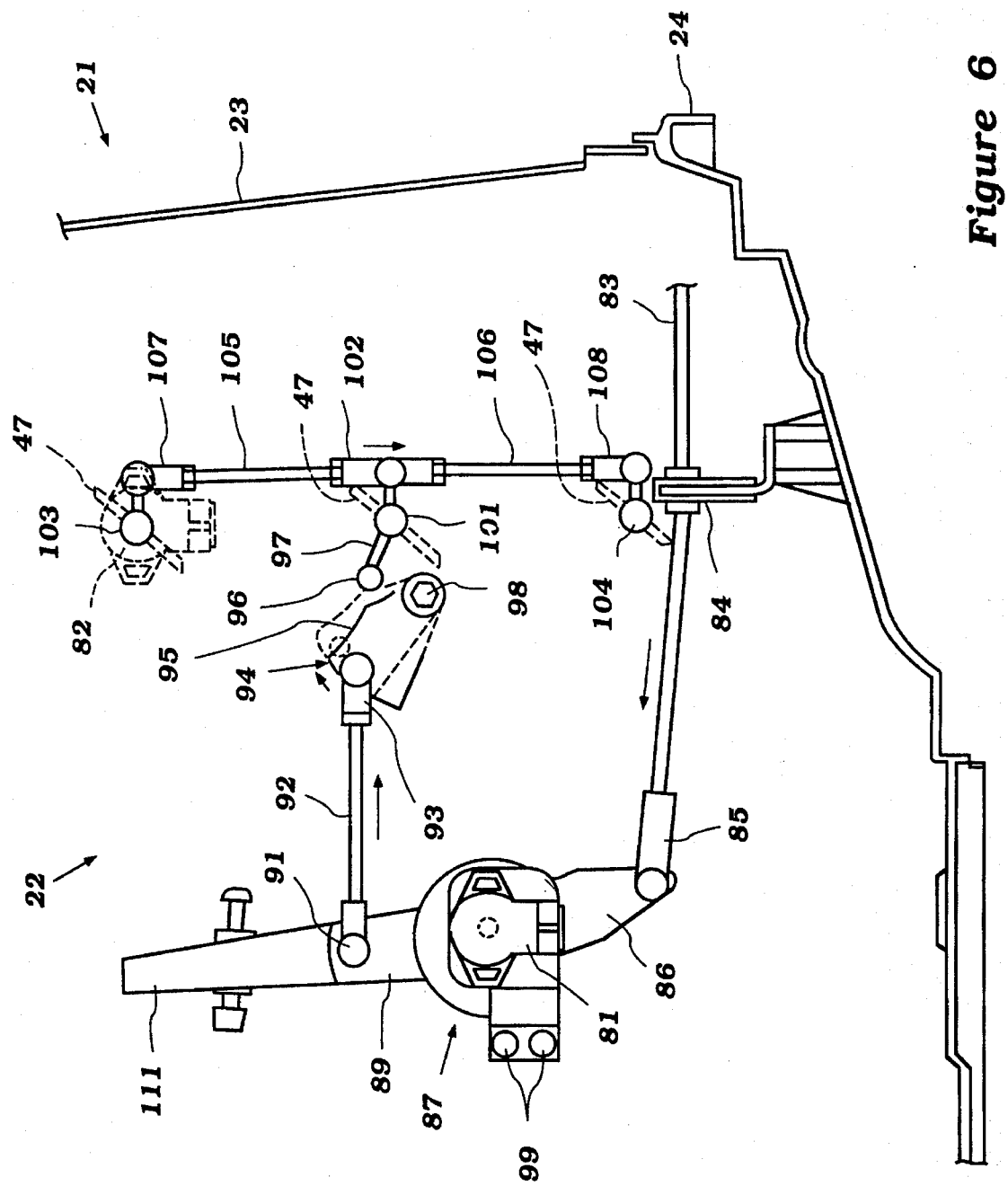
FIG. 6 is a side elevational view, in part similar to FIG. 2 and shows another embodiment of spark advance throttle control mechanism.

FIG. 6 shows another embodiment of the invention. This embodiment is basically the same as the embodiment of FIG. 2 and differs from that embodiment only in the position of the sensor for determining the operator desired speed signal. Rather than having the sensor 81 associated with the speed controlling throttle cam 94, this embodiment places the sensor 81 on the engine adjacent the pivot pin 88 for the main throttle control lever 86. Therefore, this sensor 81 senses the actual position of the control lever 86 which signal should be the same as that for the previously described embodiment. However, this positioning permits the sensor 81 to be positioned in an area free of the actual throttle control cam 94.

Figure 7:
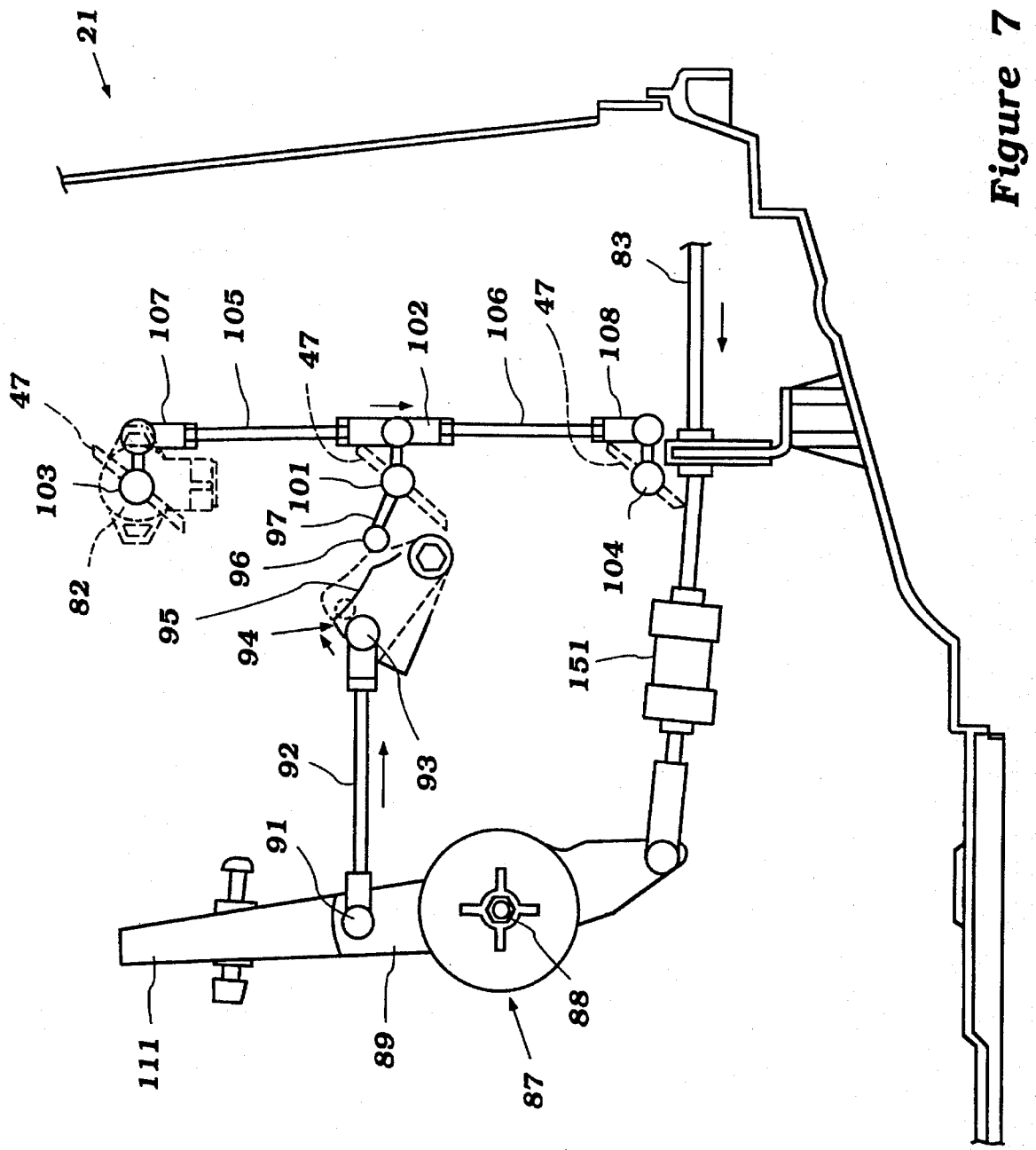
FIG. 7 is a side elevational view, in part similar to FIGS. 2 and 6 and shows a still further embodiment of the invention.

FIG. 7 shows another type of sensor mechanism, indicated generally by the reference 151 which sensor mechanism actually cooperates with the wire actuator 83 so as to provide a signal indicative of the operator demand and, accordingly, the position of the throttle controlling element or throttle cam 94. This sensor is a linear rather than a rotary sensor.

Figure 8:
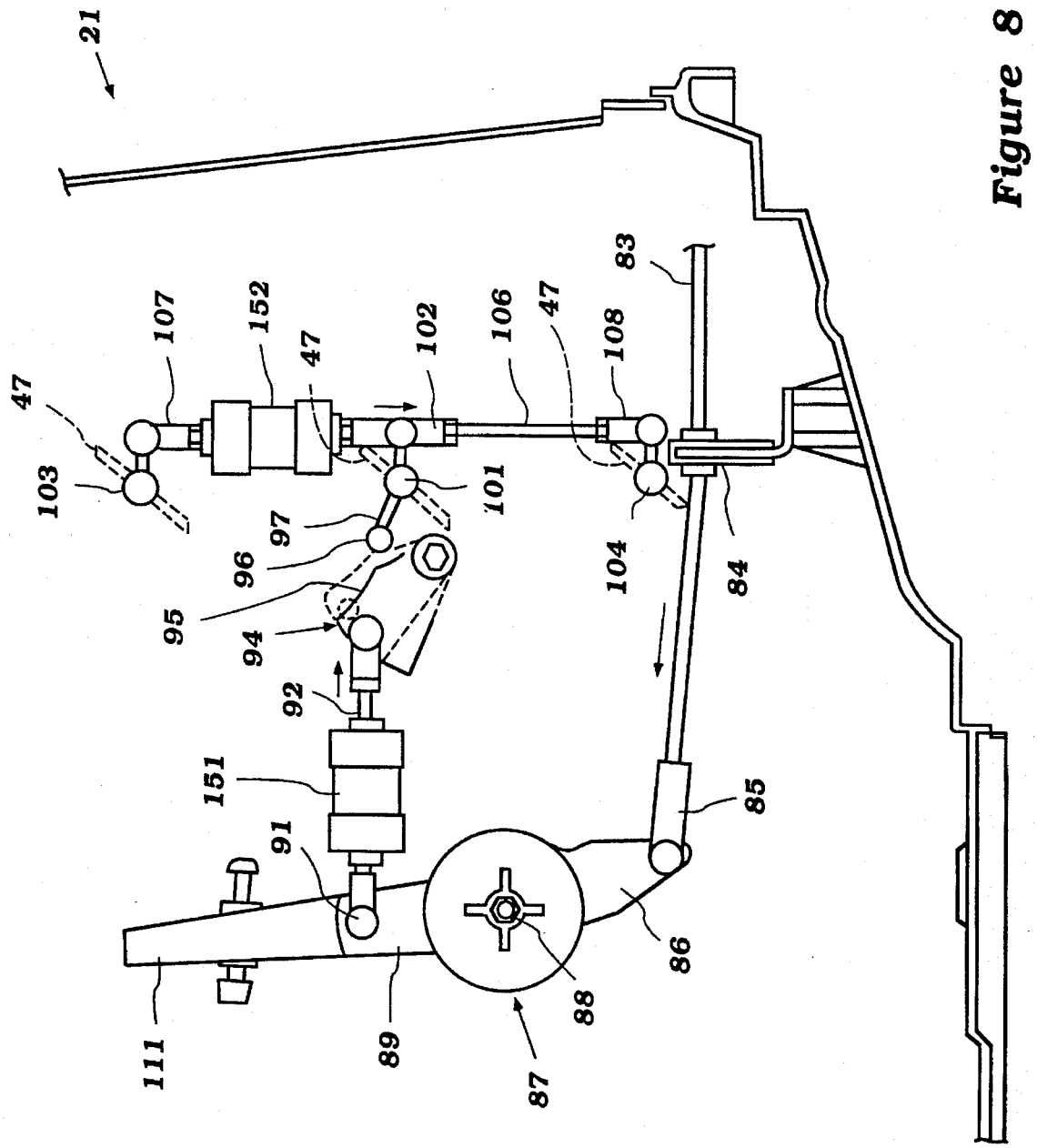
FIG. 8 is a side elevational view, in part similar to FIGS. 2, 6 and 7 and shows yet another embodiment of the invention.

FIG. 8 shows another position for the determining the operator demand. In this embodiment, a sensor like the sensor 151 is associated with the throttle control link 92 rather than with the wire actuator 83. This figure also shows the use of a sensor 152 like the sensor 151 which replaces the throttle position sensor 82. The sensors 151 and 152 are linear type sensors whereas the sensors 81 and 82 are rotary type sensors as noted.

Figure 9:
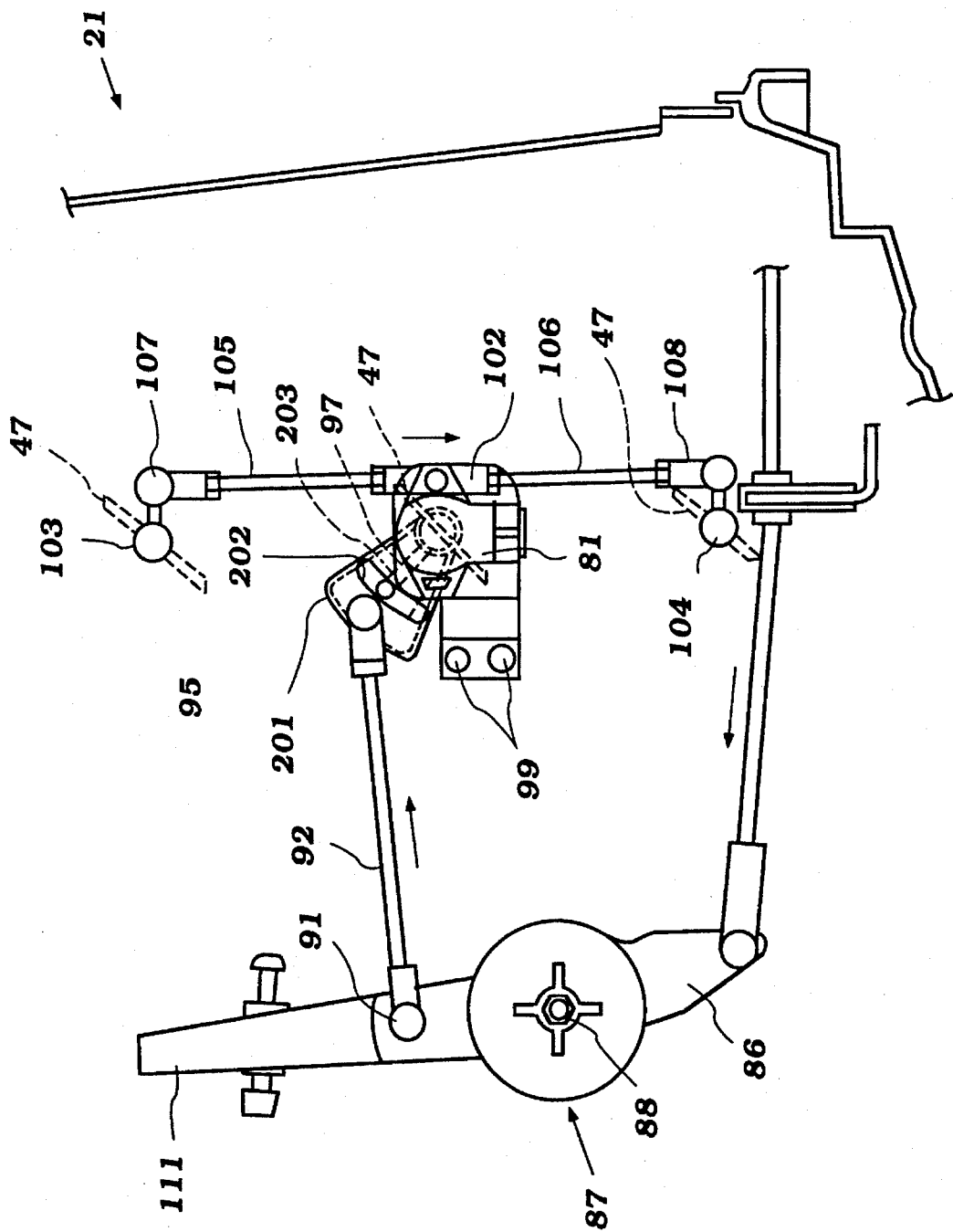
FIG. 9 is a side elevational view, in part similar to FIGS. 2, 6, 7 and 8 showing yet another embodiment of the invention.
Figure 10:
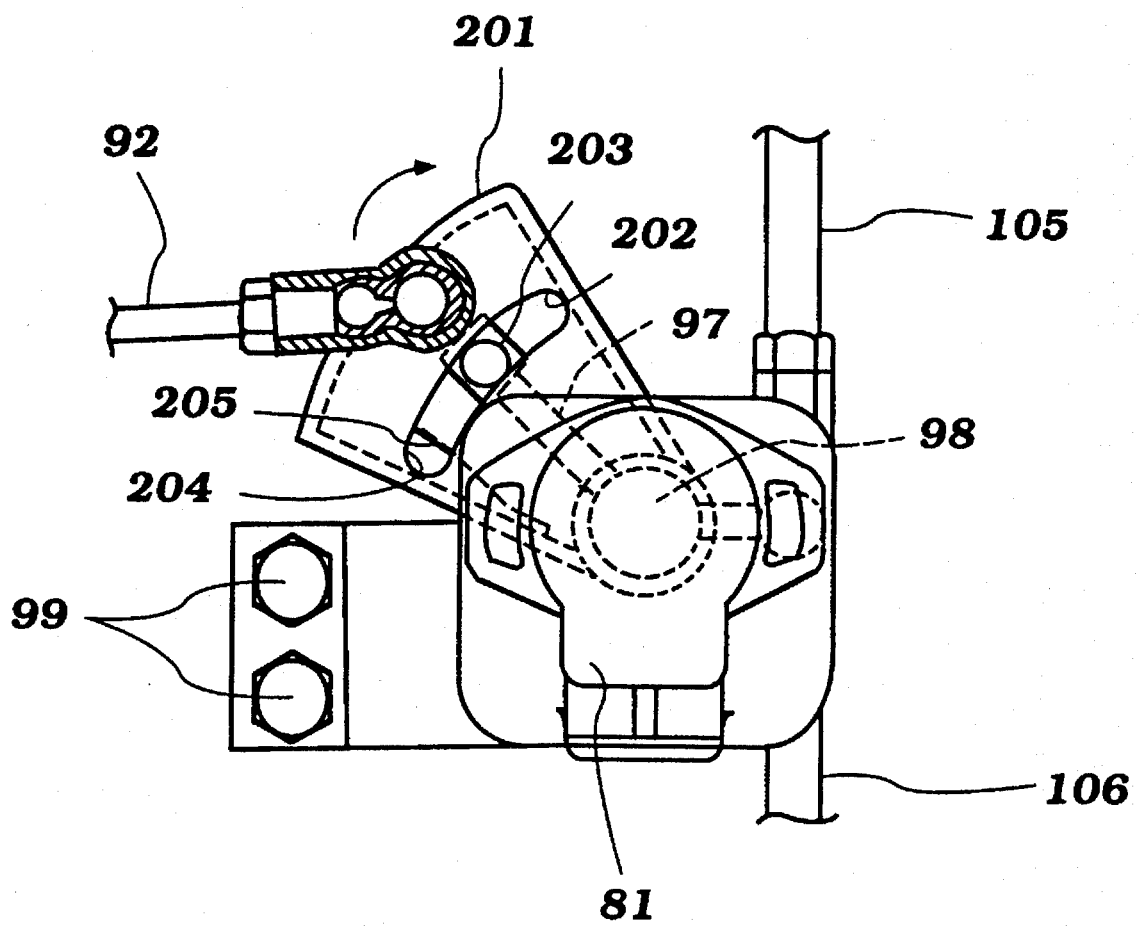
FIG. 10 is a partial view, in part similar to FIGS. 2, 6, 7, 8 and 9 showing a portion of the throttle control mechanism in accordance with yet further embodiment of the invention.

FIGS. 9 and 10 illustrate another embodiment of the invention. This embodiment differs from the embodiment of FIGS. 1 through 5 in the way in which the lost motion is accomplished between the throttle controlling element and the throttle valves 47. In this embodiment, the linkage system up to the link 92 is the same as the previously described embodiment and where elements of this embodiment are the same as those previously illustrated and described, they have been identified by the same reference numerals.

In this embodiment, the link 92 has a pivotal connection to a throttle control cam 201 that is formed with an arcuate slot 202 in which a follower pin 203 that is affixed to or formed on the throttle control lever 97 is captured. In this embodiment, when the throttle control link 92 moves, the throttle control element 201 will rotate until the slot 202 has been traversed and the pin 203 associated with the throttle control lever 97 contacts an end 204 of the slot. Upon continued movement the throttle valves 47 will be opened, as should be readily apparent.

In this embodiment, a switch 205 maybe positioned that will be contacted and closed when the pin 203 is at the end 204 of the slot 202. This switching may be utilized to provide an indication to the ECU 60 that further movement of the throttle controlling cam 201 will indicate not only the position of the throttle control cam but also the throttle valves 47. That is, this embodiment makes it possible to use a single sensor which, during initial rotation, provides a signal indicative of the position of the throttle controlling element 201 and after the switch 205 has been determined to be closed indicates both the position of the throttle controlling element 201 and the throttle valves 47.

As has been previously noted, it is a common practice when starting a cold engine to run the engine in a faster mode such as a racing mode to bring the engine to operating temperature quicker. In addition, the fuel mixture is also enriched during this condition to compensate for condensation that may occur in the engine induction system and also lack of total vaporization of the fuel.

In accordance with another facet of the invention, an arrangement is incorporated for adjusting the spark advance when in response to engine temperature. The spark advance is adjusted so that the peak pressure will occur in the combustion chamber at a point later than that necessary to achieve maximum power. In this way, the heat of the fuel is transmitted to heat the engine rather than to produce more power and/or speed. This concept may be utilized either in combination with the control strategy previously described or in lieu of it. In fact, this very strategy causes engines having the aforenoted strategy to warm up more rapidly than conventional engines.

Figure 11:
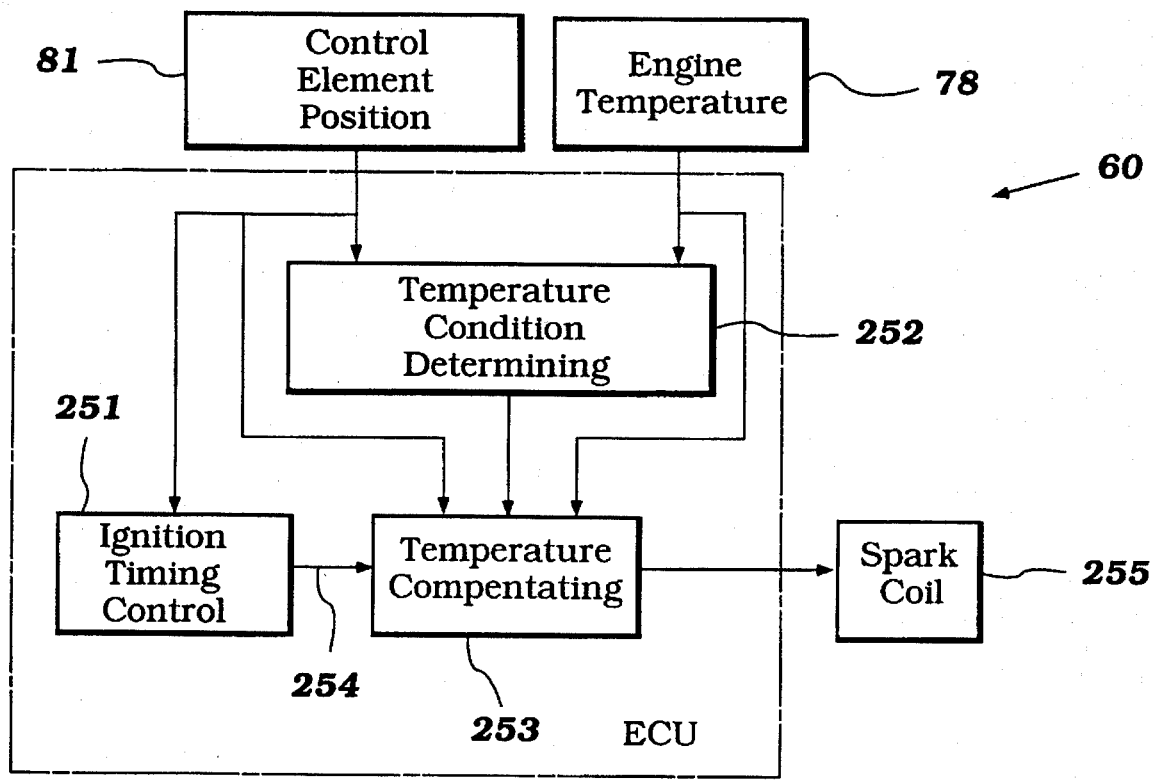
FIG. 11 is a graphical view showing the elements that function to provide the temperature compensation of the spark timing.

The way this system operates may be understood by reference first to the block diagram of FIG. 11 which shows the various elements including the control element position sensor 81 and the engine temperature sensor 78 which output their signals, as previously noted, to the ECU 60. If the invention is utilized with a conventional engine that does not have the throttle valve held in a partially open position at idle, the control element position sensor will be the throttle position sensor.

The outputs of the control element position sensor 81 are transmitted to the ignition timing control circuit, indicated by the reference numeral 251 in FIG. 11. In addition, the control element position is transmitted to a temperature condition determining circuit 252 of the ECU. The engine temperature sensor 78 is outputted both to the temperature condition determining section 252 and to a temperature compensating circuit 253. The temperature condition determining circuit 252 and control element position signal are also transmitted to this temperature compensating circuit.

The ignition timing control outputs its signal to the temperature compensating circuit 252 through an internal connection 254 and the final signal is then transmitted to a spark coil 255 which is associated with the engine spark plug or plug 61 for controlling their firing.

Figure 12:
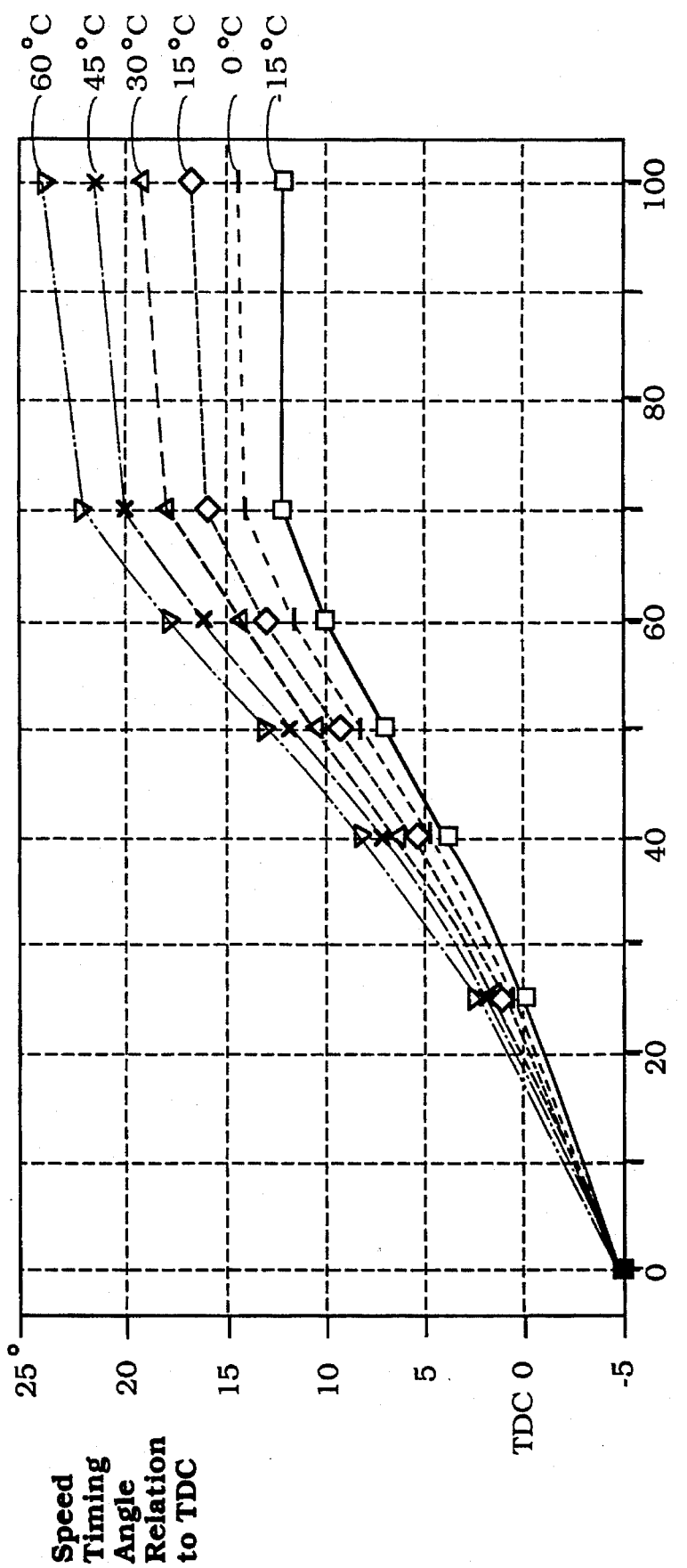
FIG. 12 is a graphical view showing the relationship of spark timing angle to speed control element position in accordance with an embodiment of the invention and at varying ambient engine temperature.
Figure 13:
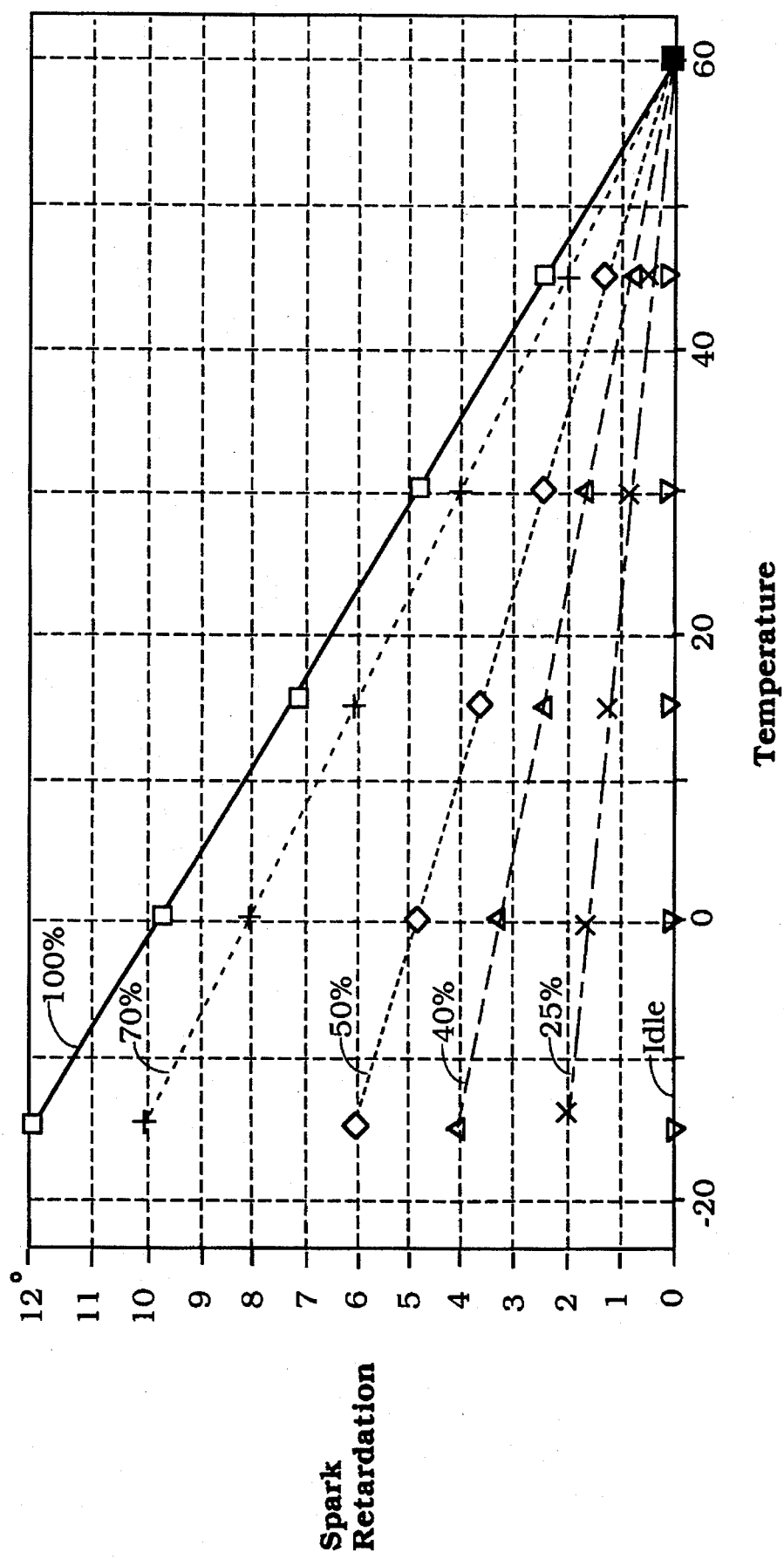
FIG. 13 is a graphical view showing the corrective factor of spark retardation in relation temperature at varying degrees of speed control element position from idle to full open.

Basically the way the system operates is that if the engine temperature falls below a predetermined normal temperature beyond which correction is not required, for example, 60° Celsius the system moves to a look up map as shown in FIG. 13 which determines the desired degree of spark retardation correction from normal in response to the position of the control element and the actual sensed engine temperature. As may be seen, at the temperature of 60° C. the spark timing is as shown by the double dot dash line curve of FIG. 12 and indicated by the inverted triangles. This is a point of zero spark retardation correction. However, as the temperature of the engine falls, the degree of spark retardation is increased with the amount of increase being greater as the throttle valve opening or control valve element position increases. That is, at wide open throttle and with an engine temperature of −15° Centigrade, the spark is retarded by a 12° over the normal from 12° or to 24° after top dead center.

As has been noted, by retarding the spark then the combustion in the combustion chamber is retarded and more of the energy from the burned fuel will be transmitted into heat of the engine body elements than to power output. In this way, the engine can be warmed up much faster and, at the same time, the actual running speed of the engine during warm up can be reduced if desired or alternatively the time at which warm up racing of the engine is required will be substantially reduced.

Thus, from the foregoing description it should be readily apparent to those skilled in the art that the described system provides very effective control over the engine so as to permit response by controlling the speed primarily through changing the spark timing rather than changing the number of cylinders which fire, although both may be utilized. In addition, warm up time can be significantly reduced thus improving both fuel economy and emission control.

Of course, the foregoing descriptions are those of preferred embodiments of the invention and various changes and modifications may be made without departing from the spirit and scope of the invention as defined by the appended claims.

What is claimed is:

1. An internal combustion engine and control system comprising elements defining at least one combustion chamber the volume of which varies cyclically during engine operation, an induction and charge forming system for delivering a fuel air charge to said combustion chamber for combustion therein, said induction and charge forming system including a throttle valve for controlling the air flow to said engine, a speed control element movable between an idle position through a pick up position to a full throttle position for operator control of the speed of said engine, a throttle control for providing an operative connection between said speed control element and said throttle valve for operator control of said throttle valve, stop means for retaining said throttle valve in a partially opened idle position wherein the effective flow area past said throttle valve is substantially greater than required for idle operation, said throttle control permitting movement of said speed control element from its idle position to its pick up position prior to opening movement of said throttle valve and for effecting opening of said throttle valve from its partially opened throttle position to a wide open throttle position upon movement of said speed control element from its pick up position to its full throttle position, an ignition system for firing the fuel air charge in said combustion chamber, an exhaust system for discharging exhaust gases from said combustion chamber to the engine, and means for controlling the speed of the engine during movement of the speed control element from its idle position to its pick-up position primarily by retarding the spark timing beyond the normal spark timing required for a given engine running condition.

2. An internal combustion engine and control system as in claim 1, wherein the spark timing occurs at approximately 10° after top dead center at idle and as advanced to approximately 2° after top dead center at the pick-up position.

3. An internal combustion engine and control system as in claim 2, wherein the rate of spark advanced continues in a substantially linear fashion between the pick-up position and a position that is substantially less than full throttle and wherein the amount of spark timing after that is not as advanced at as rapid a rate.

4. An internal combustion engine and control system as in claim 1, wherein the throttle control incorporates a lost motion connection for movement of the speed control element independently of the throttle value between the idle position and the pick-up position.

5. An internal combustion engine and control system as in claim 4, wherein the lost motion connection is comprised of a cam and follower mechanism.

6. An internal combustion engine and control system as in claim 5, wherein the cam and follower mechanism comprises a pivotally supported cam having a caming surface which does engage the follower until the cam has moved through more than a predetermined angle and wherein the follower is operatively connected to the throttle valve.

7. An internal combustion engine and control system as in claim 5, wherein the cam and follower mechanism comprises a cam element pivotally supported and operated directly by the speed control element and having a slot receiving a follower which follower is formed at the end of a lever that is connected to the throttle valve.

8. An internal combustion engine and control system as in claim 7, wherein a position detector is associated with the cam element.

9. An internal combustion engine and control system as in claim 5, wherein the spark timing occurs at approximately 10° after top dead center at idle and as advanced to approximately 2° after top dead center at the pick-up position.

10. An internal combustion engine and control system as in claim 9, wherein the rate of spark advanced continues in a substantially linear fashion between the pick-up position and the position that is substantially less than full throttle and wherein the amount of spark timing after that is not as advanced at as rapid a rate.

11. An internal combustion engine and control system as in claim 3, further including temperature sensing means for sensing the temperature of the engine and means for adjusting the spark timing if the engine temperature differs from a predetermined temperature.

12. An internal combustion engine and control system as in claim 11, wherein the predetermined temperature is a minimum operating temperature and wherein it the spark timing is retarded as the temperature decreases below the predetermined temperature.

13. An internal combustion engine and control system as in claim 12, wherein the degree of spark retardation is increased as the temperature decreases and also as the position of the speed controlling element increases.

14. An internal combustion engine and control system comprising elements defining at least one combustion chamber the volume of which vary cyclically during engine operation, an induction and charge forming system for delivering a fuel air charge to said combustion chamber for combustion therein, and ignition system for firing the fuel air charge in said such combustion chamber, an exhaust system for discharging exhaust gases from said combustion chamber to the atmosphere, an operator control for controlling the speed of said engine, spark control means responsive at least to the condition of said operator control for varying the spark timing and response to the operator demand, temperature sensing means, and means for retarding the timing of spark firing from normal if the temperature falls below a predetermined temperature for generating more heat to the engine for rapidly heating the engine.

15. An internal combustion engine and control system as in claim 14, wherein the predetermined temperature is a minimum operating temperature and wherein it the spark timing is retarded as the temperature decreases below the predetermined temperature.

16. An internal combustion engine and control system as in claim 15, wherein the degree of spark retardation is increased as the temperature decreases and also as the position of the speed controlling element increases.

17. An internal combustion engine and control system as in claim 16, wherein the induction and charge forming system includes a throttle valve for controlling the air flow to the engine, and the speed control element is movable between an idle position to a pick-up position and then to a full throttle position for the operator control of the throttle valve, the speed control element being operatively connected to the throttle valve by means including a lost motion connection for permitting movement of the speed control element between its idle position and its pick-up position before the throttle valve is open from its idle position to a full throttle position and wherein the speed of the engine is controlled during movement of the operator control element from its idle position to its pick-up position by also varying the spark timing.

18. An internal combustion engine and control method, said engine comprising elements defining at least one combustion chamber the volume of which varies cyclically during engine operation, an induction and charge forming system for delivering a fuel air charge to said combustion chamber for combustion therein, said induction and charge forming system including a throttle valve for controlling the air flow to said engine, a speed control element movable between an idle position through a pick up position to a full throttle position for operator control of the speed of said engine, a throttle control for providing an operative connection between said speed control element and said throttle valve for operator control of said throttle valve, stop means for retaining said throttle valve in a partially opened idle position wherein the effective flow area past said throttle valve is substantially greater than required for idle operation, said throttle control permitting movement of said speed control element from its idle position to its pick up position prior to opening movement of said throttle valve and for effecting opening of said throttle valve from its partially opened throttle position to a wide open throttle position upon movement of said speed control element from its pick up position to its full throttle position, an ignition system for firing the fuel air charge in said combustion chamber, an exhaust system for discharging exhaust gases from said combustion chamber to the engine, said method comprising the steps of controlling the speed of the engine during movement of the speed control element from its idle position to its pick-up position primarily by retarding the spark timing beyond the normal spark timing required for a given engine running condition.

19. An internal combustion engine and control method as in claim 18, wherein the spark timing occurs at approximately 10° after top dead center at idle and as advanced to approximately 2° after top dead center at the pick-up position.

20. An internal combustion engine and control method as in claim 19, wherein the rate of spark advanced is continued in a substantially linear fashion between the pick-up position and a position that is substantially less than full throttle and wherein the amount of spark timing after that is not as advanced at as rapid a rate.

21. An internal combustion engine and control system as in claim 20, wherein the spark timing occurs at approximately 10° after top dead center at idle and as advanced to approximately 2° after top dead center at the pick-up position.

22. An internal combustion engine and control method as in claim 21, wherein the rate of spark advanced continues in a substantially linear fashion between the pick-up position and the position that is substantially less than full throttle and wherein the amount of spark timing after that is not as advanced at as rapid a rate.

23. An internal combustion engine and control method as in claim 20, further including the step of sensing the temperature of the engine and adjusting the spark timing if the engine temperature differs from a predetermined temperature.

24. An internal combustion engine and control method as in claim 23, wherein the predetermined temperature is a minimum operating temperature and wherein the spark timing is retarded as the temperature decreases below the predetermined temperature.

25. An internal combustion engine and control method as in claim 24, wherein the degree of spark retardation is increased as the temperature decreases and also as the position of the speed controlling element increases.

26. An internal combustion engine and control method, said engine comprising elements defining at least one combustion chamber the volume of which vary cyclically during engine operation, an induction and charge forming system for delivering a fuel air charge to said combustion chamber for combustion therein, and ignition system for firing the fuel air charge in said such combustion chamber, an exhaust system for discharging exhaust gases from said combustion chamber to the atmosphere, an operator control for controlling the speed of said engine, spark control means responsive at least to the condition of said operator control for varying the spark timing and response to the operator demand, said method comprising the steps of sensing the temperature, and retarding the timing of spark firing from normal if the temperature falls below a predetermined temperature for generating more heat to the engine for rapidly heating the engine.

27. An internal combustion engine and control method as in claim 26, wherein the predetermined temperature is a minimum operating temperature and wherein it the spark timing is retarded as the temperature decreases below the predetermined temperature.

28. An internal combustion engine and control method as in claim 27, wherein the degree of spark retardation is increased as the temperature decreases and also as the position of the speed controlling element increases.

29. An internal combustion engine and control method as in claim 28, wherein the speed of the engine is controlled by also varying the spark timing during a phase or engine running.

* * * * *